US006563975B2

(12) United States Patent
Towery

(10) Patent No.: US 6,563,975 B2
(45) Date of Patent: May 13, 2003

(54) METHOD AND APPARATUS FOR INTEGRATING OPTICAL FIBERS WITH COLLIMATING LENSES

(75) Inventor: Clay E. Towery, Plano, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/884,500

(22) Filed: Jun. 18, 2001

(65) Prior Publication Data

US 2002/0191238 A1 Dec. 19, 2002

(51) Int. Cl.$^7$ .............................. G02B 6/43; G02B 6/26
(52) U.S. Cl. .............................. 385/18; 385/89; 385/94
(58) Field of Search ...................... 359/619, 621–622, 359/629, 513, 290, 291, 514, 624, 507; 385/88–94, 52, 96, 15–24, 51, 97, 49; 65/152

(56) References Cited

U.S. PATENT DOCUMENTS

| 5,346,583 | A | * | 9/1994 | Basavanhally | ................ 216/26 |
| 5,566,265 | A | * | 10/1996 | Spaeth et al. | .................. 385/93 |
| 5,699,464 | A | * | 12/1997 | Marcuse et al. | ............... 385/31 |
| 5,925,898 | A | * | 7/1999 | Spath | .......................... 257/432 |
| 6,360,039 | B1 | * | 3/2002 | Bernard et al. | ................ 385/33 |

| 2002/0071639 | A1 | * | 6/2002 | Kroop | .......................... 385/88 |

OTHER PUBLICATIONS

"8×8 Passport Optical Switching Engine™" Onix Microsystems, Richmond, California, 2 pages, 2001 (author unknown).
"Passport Developers Kit", Onix Microsystems, Richmond, California, 2 pages, 2001 (author unknown).

* cited by examiner

Primary Examiner—Robert H. Kim
Assistant Examiner—Krystyna Suchecki
(74) Attorney, Agent, or Firm—Baker Botts L.L.P.

(57) ABSTRACT

A two-dimensional optical switch (10) includes a hermetically sealed housing (41) cooperable with several input fibers (11–18) and several output fibers (21–28). A digital micromirror device (71) is disposed within the housing, and can selectively effect travel of radiation between each input fiber and any one of the output fibers. The housing includes two lens sections (56, 57), which each have a platelike support portion (106), and several lens portions (111–118) of approximately semi-spherical shape that project from the inner side of the support portion. Each of the input fibers is fixedly secured to an outer side of one lens section in alignment with a respective lens portion thereon, and each of the output fibers is fixedly secured to the outside of the other lens section in alignment with a respective lens portion thereon.

17 Claims, 2 Drawing Sheets

METHOD AND APPARATUS FOR INTEGRATING OPTICAL FIBERS WITH COLLIMATING LENSES

TECHNICAL FIELD OF THE INVENTION

This invention relates in general to the handling of optical signals and, more particularly, to configurations in which several optical fibers are associated with respective collimating lenses.

BACKGROUND OF THE INVENTION

Telecommunications is a field which has been rapidly evolving over the past twenty years, fueled in part by the progressively increasing popularity of technologies such as cellular telephones, facsimile machines, and computer communications that use the Internet. Due to these growing new technologies, there has been a progressively increasing demand for telecommunications equipment with greater information-carrying capacity, which in turn has created a progressively increasing focus on effecting communications through the use of optical signals.

High bandwidth fiber optic telecommunication systems are being deployed around the world. This is creating a backbone system which couples major metropolitan areas. Currently, when these existing systems need to effect switching of an optical signal, they typically convert the optical signal into an electrical signal, effect electrical switching of the electrical signal, and then convert the resulting electrical signal back into an optical signal. This greatly delays the propagation of information through the system, and is expensive because it increases the complexity of the system.

In order to avoid this problem, attempts are being made to develop optical switches which would directly switch optical signals, without temporarily converting them into electrical signals. While existing approaches to optical switching have been generally satisfactory for their intended purposes, they have not been satisfactory in all respects.

For one example, one existing type of optical switch is known as a two-dimensional optical cross connect (OXC) switch. It has a hermetically sealed housing that contains a digital micromirror device (DMD), which is also sometimes referred to as a micro-electro-mechanical system (MEMS) device. The DMD has a plurality of movable mirror parts arranged in a two-dimensional array. The hermetically sealed housing includes two transmissive windows arranged at an angle to each other. Externally of the housing, two plates each have several V-shaped grooves that are formed by diamond point turning and that extend perpendicular to a respective one of the windows. Each groove has a collimating lens mounted therein at a location spaced from the associated window, and has an optical fiber end mounted therein, often at a location spaced from the collimating lens. Radiation traveling through one of the optical fibers can exit the end of that fiber, pass through the associated collimating lens, pass through the associated window, undergo reflection by a respective mirror part of the DMD, pass through the other window, pass through another collimating lens, and then enter another optical fiber.

In this type of device, insertion losses from an input fiber to an output fiber are relatively high, and are typically on the order of 3 dB to 4 dB. This is due in part to the fact that various individual components have sufficient differences in their coefficients of thermal expansion so as to generate significant alignment errors across the operational temperature range of the switch. Further, even for a given temperature, it is complex and time-consuming to attempt to achieve suitable alignment of the multiple independent components during assembly of the switch, as a result of which these existing switches are relatively expensive to make, and the production yields are relatively low. Also, even though the windows theoretically have no optical power, in practice they are non-ideal and may each have a slight wedge shape that introduces a small optical power.

A further consideration is that environmental conditions such as vibration and shock can produce dynamic alignment problems between the multiple components. Still another consideration is that there are a number of optical surfaces that are susceptible to environment factors such as dust, moisture and outgassing of plastic or adhesive materials used to couple the various components together. These optical surfaces typically include the end surface of each fiber, two end surfaces of each collimating lens, and the outer surface of each transmissive window.

SUMMARY OF THE INVENTION

From the foregoing, it may be appreciated that a need has arisen for a method and an apparatus that reduce susceptibility to insertion loss and/or environmental factors in a context wherein optical fibers are associated with respective lens structures. According to one form of the present invention, a method and apparatus are provided to address this need, and involve: supporting a plurality of optical parts on a base; adjusting a lens section to a selected position with respect to the base, the lens section including a support portion made of an optically transmissive material, and including a plurality of lens portions made of an optically transmissive material and provided at spaced locations on a first side of the support portion, the lens portions each being aligned with a respective optical part in the selected position of the lens section; fixedly securing the lens section in the selected position with respect to the base; positioning an end of each of a plurality of optical fibers to be adjacent the support portion on a second side thereof opposite from the first side, and to be in an alignment position with respect to a respective lens portion; and fixedly attaching the end of each fiber to the second side of the support portion.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
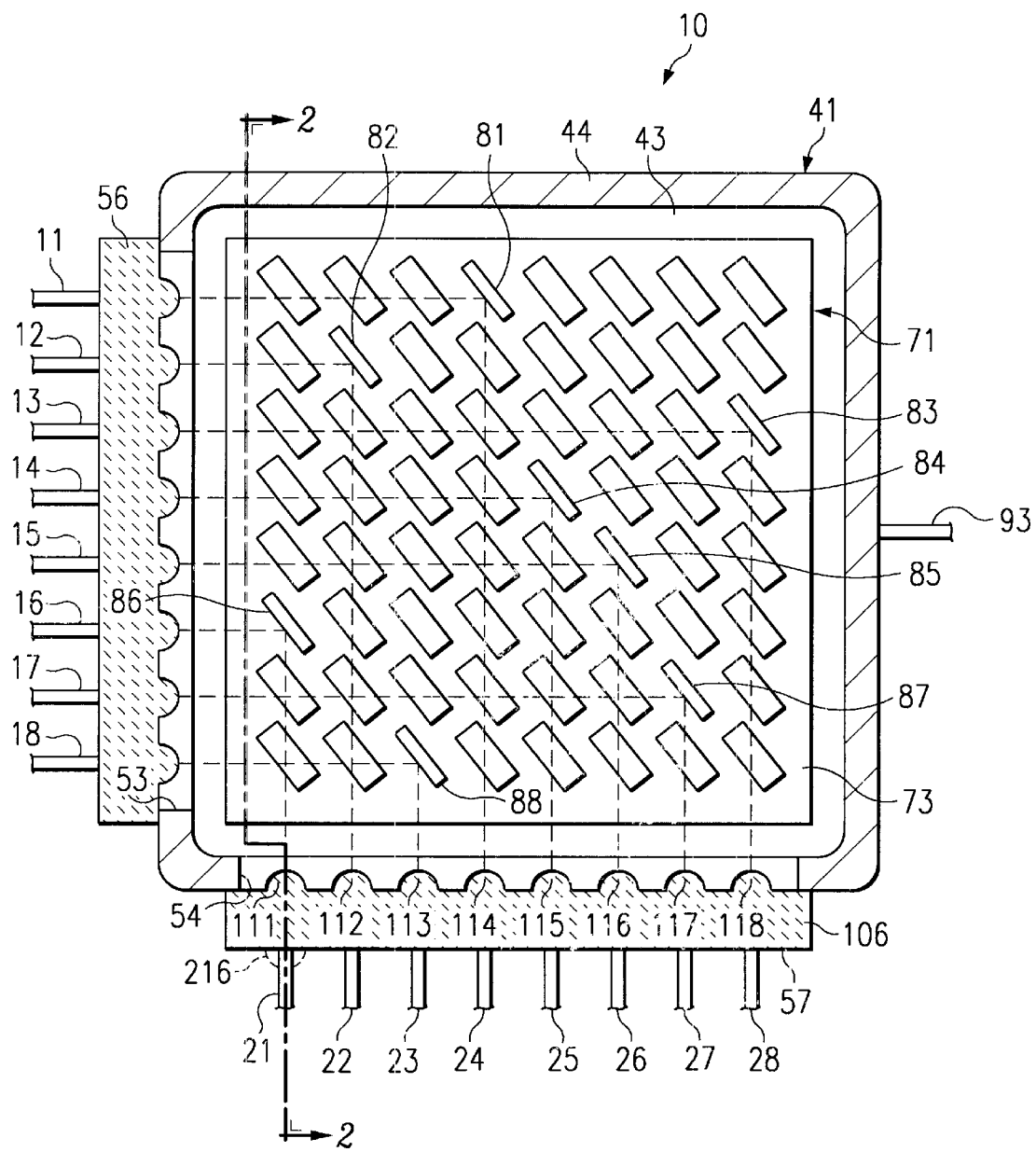
FIG. 1 is a diagrammatic sectional top view of a two-dimensional optical cross connect switch that embodies the present invention.
Figure 2:
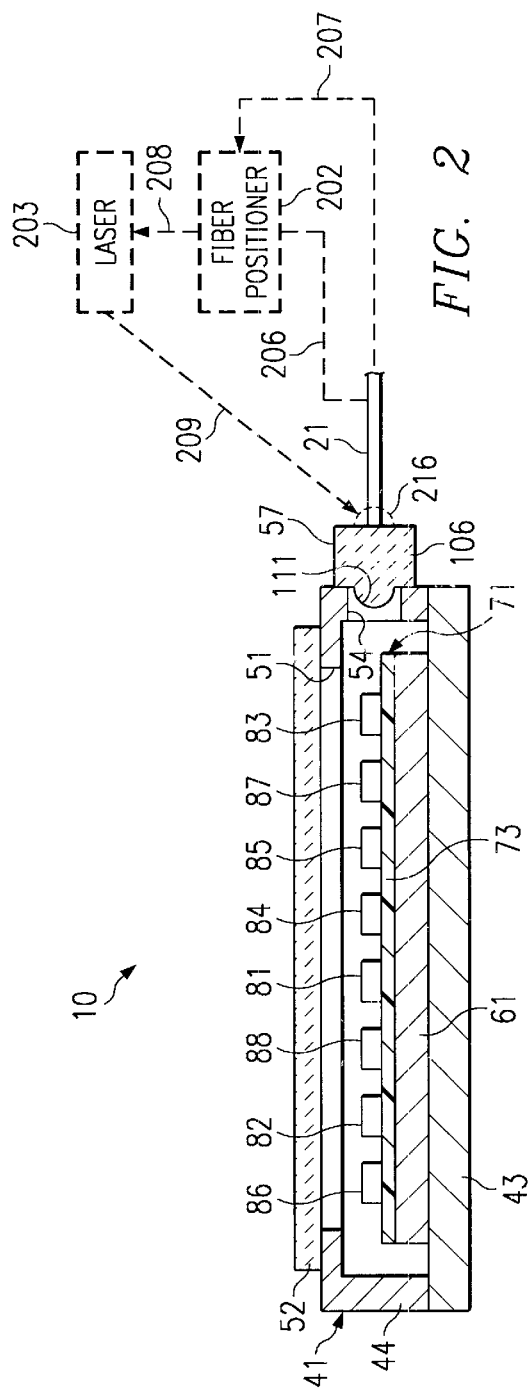
FIG. 2 is a diagrammatic sectional side view of the switch of FIG. 1, taken along the line 2—2 in FIG. 1, and which also diagrammatically shows in broken lines a fiber positioner and a laser.

FIG. 1 is a diagrammatic sectional top view of a two-dimensional optical switch 10, which embodies aspects of the present invention. FIG. 2 is a diagrammatic sectional side view of the switch 10, which is taken along the line 2—2 in FIG. 1, and which also shows a fiber positioner and a laser that are discussed later.

The optical switch 10 includes eight optical fibers 11–18 that serve as input fibers, and eight optical fibers 21–28 that serve as output fibers. Each of the fibers 11–18 and 21–28 is a component of a type known to those skilled in the art, and has a central core which is concentrically surrounded by a cladding. As a matter of convenience for purposes of explaining the present invention, the fibers 11–18 are referred to herein as input fibers, and the fibers 21–28 are referred herein as output fibers. However, any of the fibers 21–28 could function as an input fiber, and any of the fibers 11–18 could function as an output fiber. In fact, the switch 10 and the fibers 11–18 and 21–28 are bidirectional, and fully capable of handling simultaneous transmission of optical radiation in opposite directions through the switch and any of the fibers.

The switch 10 is capable of selectively coupling each input fiber 11–18 to any one of the output fibers 21–28, in a manner described in more detail later. In fact, at any given point in time, the switch 10 is capable of effecting an optical coupling between every one of the input fibers 11–18 and a respective one of the output fibers 21–28. Thus, the switch 10 implements a device of the type commonly known in the industry as an 8×8 optical cross connect (OXC) switch. However, it will be recognized that the present invention is not restricted to use in an 8×8 switch, but could also be used in a switch having a larger or smaller number of input fibers, and a larger or smaller number of output fibers. In fact, there are aspects of the present invention which also have utility in devices other than an optical switch.

Turning now in more detail to the switch 10, it includes a housing 41 which has a base plate 43 and a cap 44. The base plate 43 is made from a ceramic glass composite which is plated with gold or silver, such as a low temperature co-fired ceramic (LTCC) available commercially as part number DuPont 951 from DuPont Electronic Materials of Research Triangle Park, N.C. This material has a coefficient of thermal expansion (CTE) of 5.8 ppm/C°. The cap 44 is made from a metal material such as a tungsten/nickel/copper alloy (WNiCu), with a CTE of 4.5 ppm/C°. The cap 44 has four sidewalls arranged to define a square frame, and has a top wall extending between the upper ends of the sidewalls. The lower edges of the sidewalls are soldered to the upper surface of the base plate 43 using a suitable solder of a known type, such as gold/tin (AuSn) solder.

With reference to FIG. 2, the top wall of the cap 44 has a square opening 51 extending vertically through it. A square window 52 is a platelike element made from a borosilicate glass material, such as the glass material available commercially as catalog number 7059 from Corning Incorporated of Danville, Va. The peripheral edges of the window 52 are soldered to the cap 44 using a gold/geranium (AuGe) solder, and in particular are soldered to an annular surface portion which is provided on the top wall and which extends around the opening 51. One of the sidewalls of the cap 44 has a rectangular opening 53 extending horizontally through it, and a different sidewall of the cap 44 has another rectangular opening 54 extending horizontally through it.

The housing 41 includes two lens section 56 and 57. The lens sections 56–57 are briefly discussed here, and then are discussed in more detail later. In the disclosed embodiment, they are each made from the same borosilicate glass material as the window 52, which has a CTE of 4.6 ppm/C°. The lens sections 56 and 57 could alternatively be made from some other suitable material, such as a fused silica material. The lens sections 56 and 57 each have on an inner side thereof an annular surface portion which extends along the peripheral edge thereof, and which is soldered to an annular surface portion that extends around an respective opening 53 or 54 on the exterior surface of the cap 44. In the disclosed embodiment, the lens sections 56 and 57 are each soldered to the cap 44 using a gold/geranium (AuGe) solder. This provides a good hermetic seal between the lens sections and the cap, with good reliability.

Although the lens sections 56–57 are secured in place with solder in the disclosed embodiment, they could alternatively be fused or bonded to the cap 44 in some other manner. As one example, the cap 44 could be made from steel, such the specific type readily commercially available from a number of vendors as ASTM-F15. The lens arrays 56–57 could each be sized to fit snugly within the associated rectangular opening 53 or 54, and then the glass material of each lens array could be directly bonded to the metal material of the cap using a known technique which produces a bond commonly known in the art as a Frit seal. This provides a good hermetic seal between each lens section and the cap, which is reliable even in harsh environments.

Another example of an alternative technique for bonding the lens arrays 56–57 to the cap 44 is to use, instead of a solder, an epoxy adhesive of a type known in the art. This represents a low temperature sealing technique, which is suitable for some applications and provides good resistance to moisture.

The housing 41 thus includes the base plate 43, cap 44, window 52, and lens sections 56–57. The housing 41 is a hermetically sealed container, the interior of which is subject to a vacuum. As evident from the foregoing discussion, the various parts of the housing 41 are made from materials having similar coefficients of thermal expansion, so that temperature variations will not generate stresses which tend to break the solder connections and/or effect an increase in insertion losses. The input fibers 11–18 each have an end which is fused to an outer side of the lens section 56, and the output fibers 21–28 each have an end which is fused to an outer side of the lens section 57, as discussed in more detail later.

With reference to FIG. 2, a spacer plate 61 is mounted on the top surface of the base plate 43, within the interior of the housing 41. In the disclosed embodiment, the spacer plate 61 is made from alumina, and has an exterior surface which is plated with copper. The spacer plate 61 has a CTE in the range of about 6.9 to 7.3 ppm/C°. A digital micro mirror device (DMD) 71 of a known type is mounted on top of the spacer plate 61, the spacer plate 61 serving to establish an appropriate vertical position for the DMD within the housing 71. A DMD of the type shown at 71 is also sometimes referred to in the art as a micro-electro-mechanical systems (MEMS) device. In the disclosed embodiment, the DMD 71 is an existing component manufactured by Analog Devices, Inc. of Norwood, Mass. The DMD 71 is soldered to the spacer plate 61, using Indalloy 164 solder, which is well known in the art.

The DMD 71 includes a platelike silicon substrate 73, and has 64 mirror parts movably supported on the upper side of the substrate 73, eight of the mirror parts being designated by reference numerals 81–88 in FIG. 1. The 64 mirror parts of the DMD 71 are arranged in a two-dimensional 8×8 array, with eight rows and eight columns. Each of the mirror parts can pivot about an axis adjacent one edge thereof between an approximately horizontal position generally flush with the top surface of the substrate 73, and an upright position extending vertically upwardly from the substrate 73 approximately perpendicular thereto. Each mirror part thus pivots through an angle of approximately 90°. As evident from FIG. 1, the eight mirror parts identified by the reference numerals 81–88 are each shown in the upright position, and all of the other mirror parts are shown in the horizontal position.

In the DMD 71, movement of each mirror part is effected electromagnetically. However, it would alternatively be possible to move each mirror part in some other manner, for example using electrostatic forces. Each of the mirror parts has on one side thereof a reflective surface, the reflective surface being on the top side of the mirror part when the mirror part is in its horizontal position. When the mirror part is in its upright position, the reflective surface forms an angle of substantially 45° with respect to one of the input fibers 11–18 and also with respect to one of the output fibers 21–28. For example, it will be noted that the reflective surface on mirror part 81 forms an angle of 45° with respect to each of the fibers 11 and 24.

It will thus be recognized that each mirror part can optically couple one of the input fibers to a respective one of the output fibers, for example as indicated diagrammatically in FIG. 1 by an L-shaped line which represents an optical path extending from the input fiber 11 to the mirror part 81 and then to the output fiber 24. When each mirror part is in its retracted or horizontal position, it is vertically lower than and does not interact with radiation traveling between any of the input and output fibers. On the other hand, when each mirror part is in its upright position, it reflects radiation traveling between the associated input and output fibers.

The movement of the mirror parts of the DMD 71 is controlled by digital signals received through a cable 93 that serves as a control interface. In the disclosed embodiment, the control interface 93 may conform to the industry-standard RS-232 protocol, may be transistor-transistor-logic (TTL) signals, or may conform to some other interface protocol. The distal end of the control interface 93 is coupled to a suitable control circuit of a known type, which is not illustrated and described here in detail.

Figure 3:
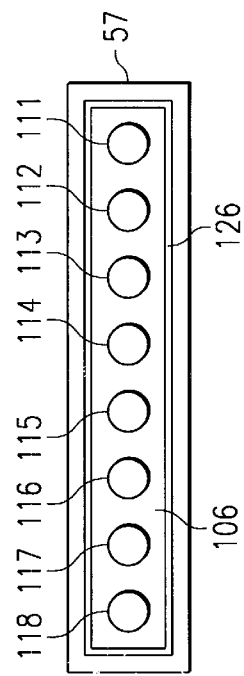
FIG. 3 is an elevational view of an inner side of a lens section which is a component of the switch of FIG. 1.

Turning in more detail to the lens sections 56 and 57, the lens sections 56–57 in the disclosed embodiment are identical. Therefore, only the lens section 57 is described in detail. In this regard, FIG. 3 is a diagrammatic elevational view of the inner side of the lens section 57. As best seen in FIGS. 1 and 3, the lens section 57 includes a support portion 106 which has the shape of approximately flat, rectangular plate. The lens section 57 also includes eight lens portions 111–118, which project outwardly from the inner side of the support portion 106, into the opening 54 through the wall of cap 44. Each of the lens portions 111–118 has approximately the shape of portion of a sphere, and serves as a collimating lens.

In the disclosed embodiment, the lens section 57 is made from a single piece of the above-mentioned Corning 7059 borosilicate glass material, the support portion 106 and the lens portions 111–118 being respective integral portions of this single piece of glass material. The lens section 57 can be fabricated in any suitable manner, for example by molding the glass material, or by using a laser writing technique to selectively remove material from a larger initial piece of glass, until the remaining material defines the lens section 57. In the disclosed embodiment, the lens portions 111–118 are arranged at uniformly spaced locations along a horizontal line, the center-to-center distance between each adjacent pair of the lens portions 111–118 being equal to the distance between two adjacent input fibers 11–18 or two adjacent output fibers 21–28.

An approximately rectangular ring 126 of gold/geranium (AuGe) solder is provided on the support portion 106, in particular on an annular surface portion thereon which extends around all of the lens portions 111–118. The solder ring 126 sealingly couples the lens section 57 to the exterior of the cap 44, and in particular to an annular surface portion thereon which extends around the opening 54 therein.

The manner in which the optical switch 10 is assembled will now be briefly described. The spacer plate 61 and the cap 44 are each soldered to the base plate 43. The substrate 73 of the DMD 71 is soldered to the spacer plate 61. Next, the lens sections 56 and 57 are positioned with respect to the housing 41, and then secured to the housing 41, in the following manner.

The lens section 57 is placed in approximately the position shown in FIGS. 1 and 2. At this time, the output fibers 21–28 have not yet been secured to the lens section 57. One of the mirror parts in the left column, for example the mirror part 86, is set to be in its upright position. A beam of radiation is caused to travel along the L-shaped path associated with mirror part 86, so that it travels rightwardly in FIG. 1 to the mirror part 86, and then is reflected by the mirror part and travels downwardly.

While holding the lens section 57 stationary in a selected position with respect to the housing 41, an end of an optical fiber is placed against the outer side of the lens section 57, and is moved relative to the lens section 57 while measuring the amount of focused radiation from the lens portion 111 which enters the optical fiber. There are known techniques for moving the fiber and measuring the amount of radiation which enters it, one of which is described later. The maximum amount of radiation measured for this particular position of the lens section 57 is recorded. In essence, this is a determination of the amount of radiation from the beam which, at the surface on the outer side of the lens section 57, is focused by the lens portion 111 into a region of predetermined size around an optical axis of the convergent radiation traveling away from the lens portion 111.

The left end of lens section 57 (FIG. 1) is then moved slightly, and held stationary in this new position while the movement of the optical fiber and the measurement of the radiation is repeated, in order to identify and record the maximum measured amount of radiation associated with this new position of the lens section. This procedure is repeated for a number of additional positions of the lens section 57. Then, the recorded values are compared in order to select the position of the lens 57 which is associated with the largest maximum measured amount of radiation. The left end of the lens section 57 is then returned to this selected position.

Next, a somewhat similar procedure is carried out for the lens portion 118 at the right end of the lens section 57 in FIG. 1, using one of the mirror parts located in the right column in FIG. 1, such as the mirror part 83. During this procedure, movement of the right end of lens section 57 (FIG. 1) involves one-dimensional movement corresponding to rotation of the lens section 57 about a central axis of the lens portion 111. In particular, for each of several such positions of the right end of the lens section 57, an end of an optical fiber adjacent the outside of the support portion 106 is moved relative to the lens section 57, while measuring the amount of focused radiation from the lens portion 118 that enters the fiber when the lens section 57 is in that position. After this evaluation has been carried out for each of several different positions of the lens section 57, a determination is made of which of these positions of the right end of the lens section 57 yielded the maximum measured amount of radiation, and then the right end of the lens section 57 is returned to this position.

With the right and left ends of the lens section 57 now held in their empirically selected positions, the assembly is heated to a temperature which melts the solder ring 126

(FIG. 3). The assembly is then cooled, so that the solder ring 126 hardens and causes the lens section 57 to be fixedly and hermetically sealed to the cap 44 of the housing 41. Next, the lens section 56 is positioned and then secured to the cap 44 in a manner similar to that described above for the lens section 57.

Thereafter, each of the output fibers 21–28 needs to be aligned with respect to the lens section 57, and then secured to the lens section 57. Similarly, each of the input fibers 11–18 needs to be aligned with respect to the lens section 56, and then secured to the lens section 56. This is effected in the same manner for each of the fibers, and the appropriate technique is therefore described here for only one of the fibers, which is the output fiber 21.

In this regard, and with reference to FIG. 1, one of the mirror parts in the left column of the 8×8 array is moved to its upright position, for example the mirror part 86. Radiation is then directed along the L-shaped path associated with the mirror part 86, so that it travels rightwardly in FIG. 1 to the mirror part 86, is reflected by the mirror part 86, and then travels downwardly to the lens portion 111, which focuses the radiation toward the surface on the outer side of the support portion 106 of the lens section 57.

FIG. 2 diagrammatically shows a fiber positioner 202 and a laser 203. There are commercially available devices which are suitable for use as the fiber positioner 202, one example of which is a semi-automated fiber alignment system available under the trademark "ORION" from Newport Corporation of Irvine, Calif. There also are commercially available devices which are suitable for use as the laser 203, one example of which is a laser available as model J48-1W from Synrad, Inc. of Mukilteo, Wash.

The fiber positioner 202 is operatively coupled to the output fiber 21, as indicated diagrammatically by a broken line 206. The fiber positioner 202 can monitor the amount of radiation passing through the fiber 21 to its distal end, as indicated diagrammatically by a broken line at 207, while the fiber positioner 202 physically moves the proximal end of the fiber 21 adjacent the flat outer surface of the support portion 106 of lens section 57. This movement includes linear movement of the fiber end in two orthongal directions which are each parallel to the flat outer surface on support portion 106. Also, this movement may include variation of the angle formed by the end of the fiber 21 with respect to the outer surface of the support portion 106, in particular variation of this angle within a small range around a position in which the fiber end is perpendicular to the flat outer surface on support portion 106.

The fiber positioner 202 has the capability to position the fiber 21 according to a selected criteria. In the disclosed embodiment, the criteria is to move the fiber 21 to the position in which it receives the maximum amount of radiation from the lens portion 111, which typically means that the end of the fiber 21 would be positioned at the location where the flat outer surface of the support portion 106 is intersected by an optical axis along which the curved surface on the lens portion 111 is effectively focusing the beam of radiation.

When the fiber positioner 202 has positioned the fiber 21 so as to satisfy this criteria, the fiber positioner 202 enables the laser 203, as indicated diagrammatically by a broken line 208. The laser 203 then directs onto the very end of the fiber 21 a laser beam, which is indicated diagrammatically by a broken line 209. The laser beam 209 has the effect of melting the end of the fiber 21 and also the adjacent material of the support portion 106, so as to fuse the end of fiber 21 to the flat outer surface of the support portion 106, and thereby fixedly fasten them together. This forms a strong molecular bond between similar or identical materials. In the disclosed embodiment, the fiber positioner 202 and the laser 203 automatically carry out this positioning and fusing of the end of the fiber 21 with respect to the flat outer surface of the support portion 106.

After the end of the fiber 21 has been oriented and fused in this manner to the lens section 57, a small quantity of a known adhesive 216 may optionally be applied around the region where these parts have been fused. After this adhesive sets, it adds mechanical strength to the connection between the fiber 21 and lens section 57, and serves to resist relative movement between them that might weaken and/or sever the laser-fused connection. The adhesive 216 does not affect the optical operation of the fiber 21 and the lens section 57.

Although the disclosed embodiment uses a laser beam to fuse each fiber to the associated lens section, with or without the subsequent application of an adhesive, there are alternative techniques which also fall within the scope of the present invention. For example, one possible alternative is to use an arc fusing technique instead of a laser beam, where two electrically conductive probes are placed on opposite sides of the fiber closely adjacent the lens section, and then a substantial voltage is applied across the probes in order to generate an electrical arc which fuses the fiber to the lens section. After fusing the fiber and lens together using this arc fusing technique, an adhesive can optionally be applied in the same manner as discussed above for the adhesive 216. Any other suitable alternative approach could also be used.

As evident from the foregoing discussion, the disclosed embodiment is a two-dimensional optical switch 10, which effects switching between a first group of optical fibers 11–18 and a second group of optical fibers 21–28. However, it will be recognized that the invention is applicable in other contexts, including but not limited to a three-dimensional optical switch, an optical multiplexer, an optical demultiplexer, or an optical add-drop multiplexer (OADM).

The present invention provides a number of technical advantages. One such technical advantage is that several optical fibers, several collimating lenses and a window for a hermetic package are all combined into what is effectively a single integral component. This permits a high degree of alignment between the fibers, the collimating lens and optical components within the housing, so as to achieve a degree of accuracy which can reduce insertion losses for input fibers to output fibers by 50% or more over preexisting approaches. For example, the present invention can provide insertion losses less than 2 dB over the normal operational temperature range for devices of this type. Further, this accuracy can be achieved more easily and reliably than in pre-existing approaches, thereby producing higher production yields.

Since the fibers, lenses and window are effectively a single common component with an effectively uniform coefficient of thermal expansion, alignment errors between these elements are virtually negligible over the operational temperature range of the device, thereby avoiding the CTE alignment errors that tend to contribute to insertion losses in pre-existing configurations. The provision of these elements as a common component also helps to reduce or eliminate susceptibility to alignment errors caused by environmental factors such as vibration and/or shock.

Still another advantage is that each fiber and the associated collimating lens involve only a single exposed optical surface, which is the curved surface on the lens portion, and this surface is disposed within the hermetically sealed housing, where it is protected from environmental factors such as dust and moisture. Further, since the lens section effectively integrates the collimating lenses into a window for a hermetically sealed housing, the parts count is reduced by avoiding the provision of one or more separate transmissive windows in addition to a collimating lens structure, and this also avoids the inaccuracies resulting from non-ideal characteristics of separate transmissive windows, as well as the susceptibility of the external surfaces of the transmissive windows to environmental problems such as dust and moisture.

Although one embodiment has been illustrated and described in detail, it will be understood that various substitutions and alterations are also possible without departing from the spirit and scope of the present invention, as defined by the following claims.

What is claimed is:

1. An apparatus, comprising:
    a base;
    a plurality of optical parts supported on said base;
    a lens section which includes a support portion made of an optically transmissive material, and a plurality of lens portions made of an optically transmissive material and provided at spaced locations on a first side of said support portion, said lens section being supported in a fixed relationship with respect to said base so that said lens portions are each in alignment with a respective said optical part; and
    a plurality of optical fibers which each have an end secured to said support portion on a second side thereof opposite from said first side, each said optical fiber having said end thereof in alignment with a respective one of said lens portions;
    wherein each said optical fiber has said end thereof fused to said second side of said support portion of said lens section.

2. An apparatus according to claim 1, wherein each said lens portion is shaped to function as a collimating lens.

3. An apparatus according to claim 1, wherein said support portion and said lens portions are respective integral portions of a single piece of an optically transmissive material.

4. An apparatus according to claim 3,
    wherein said support portion has an approximately plate-like shape; and
    wherein each said lens portion projects outwardly from said first side of said support portion, and has a shape which is approximately a portion of a sphere.

5. An apparatus according to claim 3, wherein said single piece of optically transmissive material is made from one of a borosilicate glass and a fused silica material.

6. An apparatus according to claim 1,
    including a housing having a wall portion with an opening therethrough, said base being a portion of said housing, said optical parts being within said housing, and said lens section being a part of said housing which is disposed externally of said wall portion with said lens portions projecting into said opening;
    wherein said support portion of said lens section has on said first side thereof a first annular surface portion which extends around said lens portions; and
    wherein said wall portion has on an outer side thereof a second annular surface portion which extends around said opening and which is sealingly coupled to said first annular surface portion.

7. An apparatus according to claim 6, including a solder ring disposed between said first and second annular surface portions for effecting said sealing coupling of said lens section to said wall portion.

8. An apparatus according to claim 7, wherein said housing is hermetically sealed, said solder ring hermetically sealing said lens section to said wall portion.

9. An apparatus, comprising:
    a base;
    a plurality of optical parts supported on said base;
    a lens secton which includes a support portion made of an optically transmissive material, and a plurality of lens portions made of an optically transmissive material and provided at spaced locations on a first side of said support portion, said lens section being supported in a fixed relationship with respect to said base so that said lens portions are each in alignment with a respective said optical part; and
    a plurality of optical fibers which each have an end secured to said support portion on a second side thereof opposite from said first side, each said optical fiber having said end thereof in alignment with a respective one of said lens portions;
    including a housing having a wall portion with an opening therethrough, said base being a portion of said housing, said optical parts being within said housing, and said lens section being a part of said housing which is disposed externally of said wall portion with said lens portions projecting into said opening;
    wherein said support portion of said lens section has on said first side thereof a first annular surface portion which extends around said lens portions;
    wherein said wall portion has on an outer side thereof a second annular surface portion which extends around said opening and which is sealingly coupled to said first annular surface portion; and
    including a digital micromirror device which is disposed within said housing and which includes a plurality of movable mirror parts, each said optical part being a respective one of said mirror parts.

10. An apparatus according to claim 9,
    wherein said housing has a further opening through a further wall portion thereof;
    including a further lens section which includes a further support portion made of an optically transmissive material and includes a plurality of further lens portions made of an optically transmissive material and provided at spaced locations on a first side of said further support portion, said further lens section being a portion of said housing which is disposed externally of said further wall portion with said further lens portions projecting into said further opening, said further support portion having on said first side thereof a third annular surface portion which extends around said further lens portions, and said further wall portion having on an outer surface thereof a fourth annular surface portion which extends around said further opening and which is sealingly coupled to said third annular surface portion;
    including a plurality of further optical fibers which each have one end secured to said further support portion on a second side thereof opposite from said first side thereof; and wherein said mirror parts of said digital micromirror device are arranged in a two-dimensional array having a plurality of rows and a plurality of columns, each said lens portion of one of said lens sections being aligned with a respective said row and each said lens portion of the other of said lens sections being aligned with a respective said column.

11. An apparatus according to claim 9, wherein each said lens portion is shaped to function as a collimating lens.

12. An apparatus according to claim 9, wherein said support portion and said lens portions are respective integral portions of a single piece of an optically transmissive material.

13. An apparatus according to claim 12,
wherein said support portion has an approximately plate-like shape; and
wherein each said lens portion projects outwardly from said first side of said support portion, and has a shape which is approximately a portion of a sphere.

14. An apparatus according to claim 12, wherein said single piece of optically transmissive material is made from one of a borosilicate glass and a fused silica material.

15. An apparatus according to claim 9, wherein each said optical fiber has said end thereof fused to said second side of said support portion of said lens section.

16. An apparatus according to claim 9, including a solder ring disposed between said first and second annular surface portions for effecting said sealing coupling of said lens section to said wall portion.

17. An apparatus according to claim 16, wherein said housing is hermetically sealed, said solder ring hermetically sealing said lens section to said wall portion.

* * * * *